Figure 3:
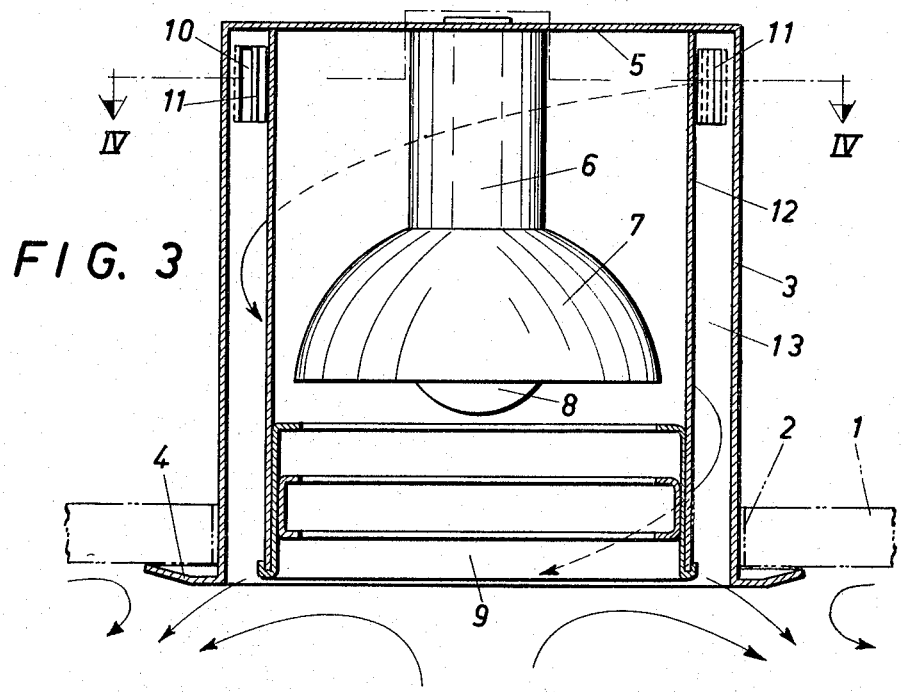

March 21, 1967     C. G. B. BURSELL     3,310,672
COMBINED LIGHTING FIXTURE AND FRESH AIR INTAKE
Filed Sept. 28, 1964     2 Sheets-Sheet 1
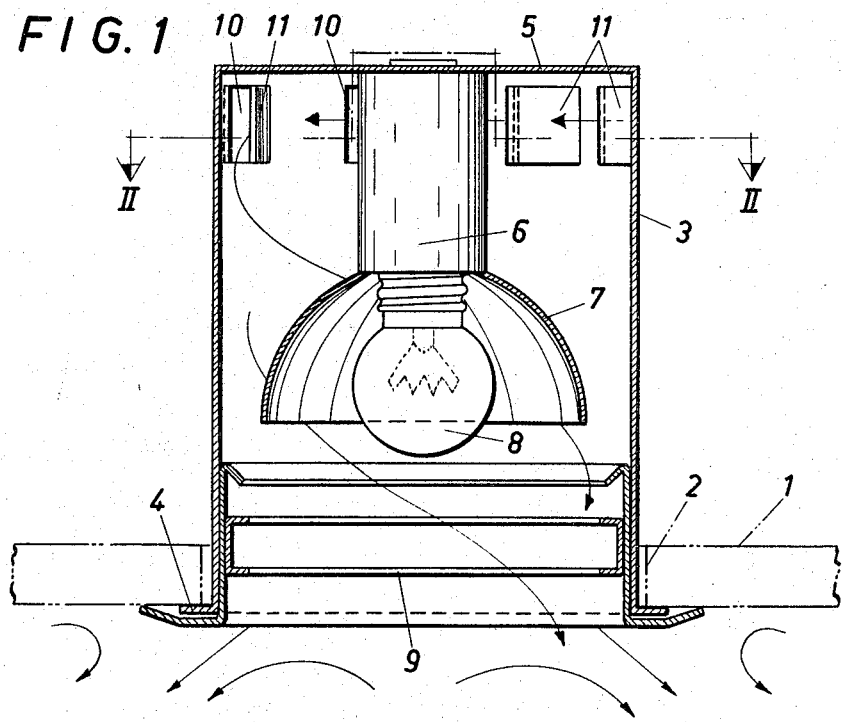
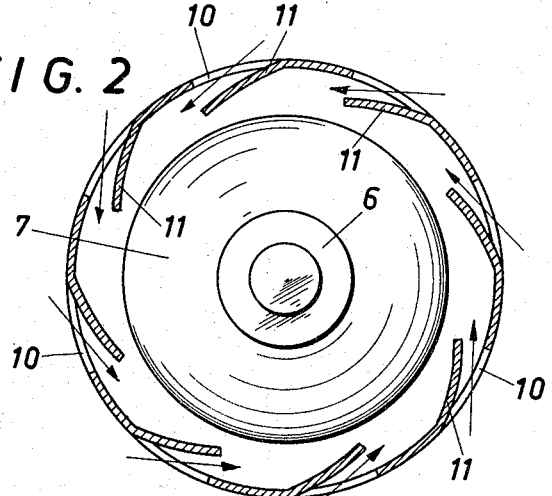
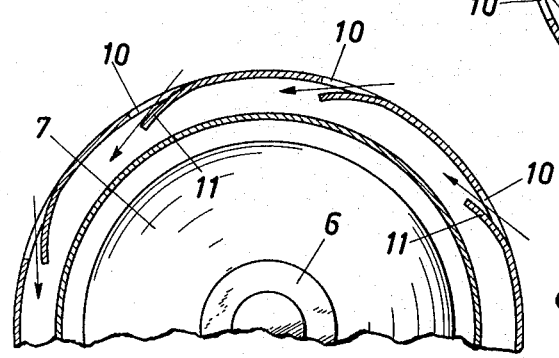
INVENTOR
CLAES GÖRAN BIRGER BURSELL
BY *Linton and Linton*
ATTORNEYS March 21, 1967  C. G. B. BURSELL  3,310,672
COMBINED LIGHTING FIXTURE AND FRESH AIR INTAKE
Filed Sept. 28, 1964  2 Sheets-Sheet 2

INVENTOR
CLAES GÖRAN BIRGER BURSELL

BY *Linton and Linton*
ATTORNEYS

3,310,672
COMBINED LIGHTING FIXTURE AND FRESH AIR INTAKE

Claes Göran Birger Bursell, 10 Violgatan, Goteborg, Sweden
Filed Sept. 28, 1964, Ser. No. 399,642
Claims priority, application Sweden, Oct. 19, 1963, 11,513/63
3 Claims. (Cl. 240—78)

The present invention relates to a combined electric lighting fixture and fresh air intake adapted for fitting into a recessed portion of a ceiling, and primarily intended for use in installations in which fresh air is supplied under pressure to the empty space above the ceiling.

According to the invention, the lighting fixture is mounted inside a casing inserted into a recess in the ceiling with its opening towards the room, and having the portion which projects above the ceiling provided with air intake slots.

According to an embodiment of the invention, the air intake slots are spaced all along the circumference of the casing, and are also, on the inside, provided with deflectors for the air entering through the slots, the said deflectors being provided for the purpose of setting the air into a whirling motion along the inside wall of the casing.

Furthermore, according to the invention, provision is made for the arrangement of an intersecting wall adapted to screen off the lighting fixture from the air intake slots, so as to form an annular raceway for the air between the said intersecting wall and the casing.

Also according to the invention, the intersecting wall may comprise the wall of a fixture-enclosing housing, adapted to slide axially in relation to the casing. The lower portion of the said housing is provided with a radially extending flange which, as a result of a displacement of the housing, forms an adjustable air discharge vent.

The fixture housing may also, according to the invention, be rotatably journalled to the casing and provided with screening members co-acting with the air intake slots in the casnig, the said screening members forming a kind of air supply control simply by turning the casing.

The invention is further described below with reference to the accomyanying drawings, in which FIG. 1 represents a cross section through an arrangement according to an embodiment of the invention, FIG. 2 a cross section substantially along the line II—II in FIG. 1, FIG. 3 a corresponding cross section through a further embodiment of the invention, FIG. 4 a cross section substantially along the line IV—IV in FIG. 3, and FIG. 5, finally, a cross section corresponding to FIGS. 1 and 3 of a still further embodiment of the invention.

The broken lines in the drawings indicate a ceiling 1, provided with an aperture 2 for the purpose of accommodating a combined lighting fixture and ventilation arrangement according to the invention. As far as the embodiment shown in FIGS. 1 and 2 is concerned, the arrangement includes a cylindrical casing 3 which is open at one end and provided with an outward-pointing flange 4, the opposite end being closed by a wall 5 to which has been attached a centrally arranged electric lamp-holder fitting, complete with lamp-shade and bulb. The casing is fitted into the aperture 2 of the ceiling 1 from underneath, with the open end facing the room and fixed to the ceiling in a suitable manner by means of the flange 4. The open end of the casing is also provided with an anti-dazzling device 9 of a type known per se.

In the cylindrical wall of the casing 3, near the upper end by the wall 5, are to be found a number of slots 10, equally distributed along the entire circumference of the casing. The said slots are formed by the punching and inward-turning of a number of tongues 11 which act as guides or deflectors for the pressurised fresh air supply passing through the slot 10 from the empty space above the ceiling 1. As indicated by the arrows in FIG. 1, the air passing through the slots will be set in a whirling motion around the lampholder fitting by the presence of the said deflectors before entering the room through the open end of the casing 3. While the arrangement is thus instrumental in establishing a supply of fresh air in the room, at the same time it also acts as an efficient cooling device for the lighting fixture.

The embodiment of the invention shown in FIGS. 3 and 4 differs from that described above mainly by the fact the casing 3 has been made with a slightly larger diameter in relation to the size of the lighting unit 6, 7, and also by the provision between the said lighting unit and the cylindrical wall of the casing 3 of a cylinder-shaped wall 12, co-axial with the casing and having its upper end tightly connected to the casing end wall 5 and downwardly extending as far as to the proximity of the open end of the casing. Between the wall 12 and the cylindrical wall of the casing 3 a gap or raceway 13 of annular cross section will thus be established through which the fresh air from the slots 10 passes in a helical orbit to the opening of the raceway 13 facing the room. In this embodiment the anti-glare screen 9 of the lamp is fitted into the cylinder 12. By means of the intersecting wall 12, the bulb and lampholder fitting are screened off from the air intake slots 10. This eliminates the risk of any particles of dust or the like in the space above the ceiling 1 being ignited while at the same time the air flowing along the surface of the intersecting wall 12, has a good cooling effect on the lighting unit.

Figure 5:
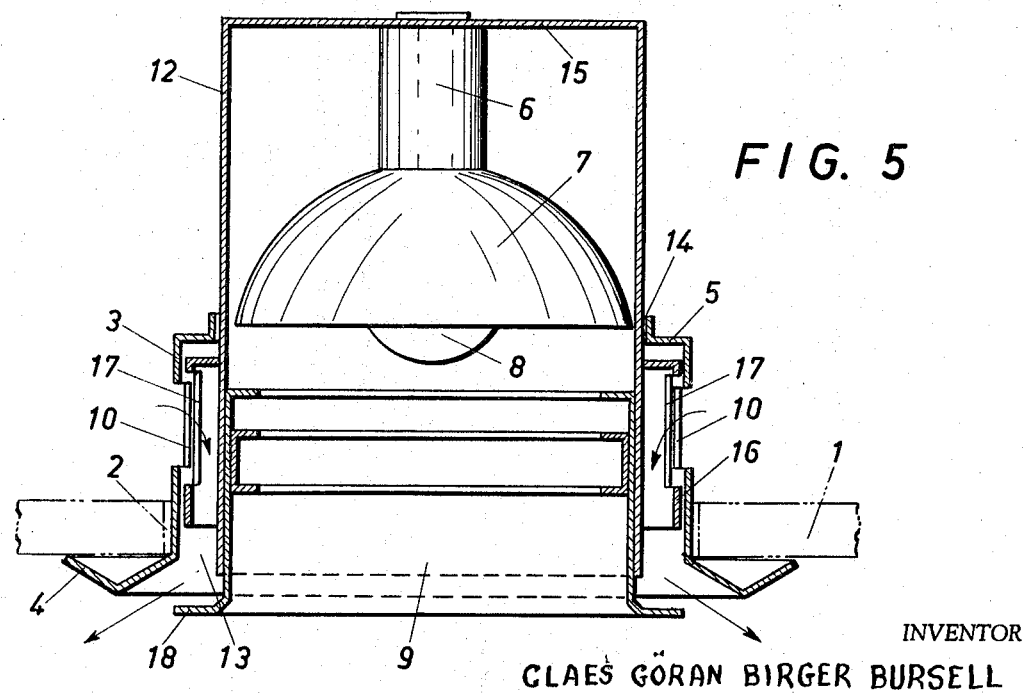

In the embodiment shown in FIG. 5, the casing 3 has been given a much shallower design than in the previously described embodiments. The cylindrical intersecting wall 12 which screens the lighting unit from the casing, in this case passes through an opening 14 in the upper wall 5 of the casing 3, and at the top the said wall 12 is provided with an end-wall 15 to which the lighting unit is attached. The lamp unit casing formed by the cylinder 12 and its end-wall 15 is adapted to slide axially as well as rotatably in relation to the casing 3, being retained in any set position by friction. This embodiment also differs from those described above by the fact that no air deflecting tongues 11 have been arranged inside the air intake slots 10. To the outside of the cylindrical wall 12 has been fixed a concentric and open-bottomed sleeve 16, positioned close to the inside of the casing 3 and provided with a number of openings 17, equal to the number of slots 10 and distributed round the sleeve with the same angular spacing as the slots 10, but greater in height than the said slots 10. In this embodiment the anti-glare screen 9, fixed inside at the open end of the casing 12, 15 containing the lighting unit, has been designed as a radially projecting flange 18, between which flange and the flange 4 of the casing is formed an exhaust vent for the annular fresh air raceway 13 between the casing 3 and the cylinder wall 12. By a twist of the casing 12, 15 the apertures 17 of the sleeve 16 may be angularly displaced in relation to the slots 10 of the casing 3, with the result that a small or large portion of the slots 10 will be screened off by the sleeve 16. A lowering or raising of the housing relative to the casing 3 will enlarge or diminish, respectively, the size of the exhaust vent formed between the two flanges 4 and 18. Facilities are thus provided for individual adjustment of the size of the air intake slots, as well as the size of the exhaust vent.

The invention is not confined to the embodiments shown in the drawings and described above in the form of examples. The details may be subject to modifications without deviating from the fundamental idea of the invention.

What I claim is:

1. A combined electric lighting fixture, and fresh air intake for installation through an opening in a ceiling above which air under pressure is supplied comprising a casing capable of being positioned through said ceiling opening and having an open end for facing below the ceiling, said casing having air intake slots spaced equidistantly along the circumference of said casing, air deflectors carried by said casing on the interior thereof for setting the air entering said slots into a whirling motion and an electric lighting means connected to said casing and positioned inside the same.

2. A combined electric lighting fixture and fresh air intake for installation through an opening in a ceiling above which air under pressure is supplied comprising a casing capable of being positioned through said ceiling opening and having an open end for facing below the ceiling, said casing having a series of air intake slots around the circumference of said casing, a housing having a wall providing an open end for said housing being slideably mounted in said casing for being slid axially in relation to said casing and a radially extending flange adjacent said casing open end providing an adjustable discharge vent for the air from said slots upon displacement of said housing and an electric lighting means carried by and positioned with said housing.

3. A combined electric lighting fixture and fresh air intake for installation through an opening in a ceiling above which air under pressure is supplied comprising a casing capable of being positioned through said ceiling opening and having an open end for facing below the ceiling, said casing having a series of air intake slots around the circumference of said casing, a housing being rotatable within said casing for rotatable alignment relative to said casing, a member carried by said housing between said housing and said casing and having a series of openings positioned for co-acting with said casing slots to adjust the air supply from said slots upon the rotation of said housing, and an electric lighting means carried by and positioned with said housing.

References Cited by the Examiner

UNITED STATES PATENTS

| 1,727,264 | 9/1929 | Young | 240—47 X |
| 2,131,054 | 9/1938 | Kurth | 240—2 |
| 2,255,849 | 9/1941 | Kurth | 240—2 |
| 2,824,217 | 2/1958 | Karole | 240—47 X |
| 3,001,056 | 9/1961 | Spear | 240—2 |

NORTON ANSHER, *Primary Examiner.*

C. C. LOGAN II, *Assistant Examiner.*